(12) United States Patent
Park et al.

(10) Patent No.: US 6,410,134 B1
(45) Date of Patent: Jun. 25, 2002

(54) AQUEOUS SILICONE COATING COMPOSITION AND POLYESTER RELEASE FILMS COATED THEREWITH

(75) Inventors: Eung-Sik Park, Seoul; Jong-Seob Won, Seongnam-si, both of (KR)

(73) Assignee: SKC Limited, Kyungki-do (KR)

( * ) Notice: Subject to any disclaimer, the term of this patent is extended or adjusted under 35 U.S.C. 154(b) by 38 days.

(21) Appl. No.: 09/635,993

(22) Filed: Aug. 9, 2000

(30) Foreign Application Priority Data

Aug. 9, 1999 (KR) ............................................. 99-32564

(51) Int. Cl.$^7$ ........................ B32B 27/08; B32B 27/28; B32B 27/36
(52) U.S. Cl. ..................... 428/336; 428/446; 428/447; 428/480; 528/15; 528/31; 528/32; 525/446; 106/287.13; 106/287.14
(58) Field of Search .................. 428/334, 336, 428/446, 447, 480; 528/15, 31, 32; 525/437, 446; 106/287.13, 287.14

(56) References Cited

U.S. PATENT DOCUMENTS

| | | | | | |
|---|---|---|---|---|---|
| 3,900,617 A | * | 8/1975 | Grenoble | ..................... | 427/387 |
| 4,791,029 A | * | 12/1988 | Fau et al. | ..................... | 428/447 |
| 5,036,117 A | * | 7/1991 | Chung et al. | ................ | 522/172 |
| 5,095,067 A | * | 3/1992 | Hara et al. | .................. | 524/506 |
| 5,104,927 A | * | 4/1992 | Hara et al. | .................. | 524/731 |
| 5,288,830 A | * | 2/1994 | Itou et al. | ..................... | 528/15 |
| 5,529,822 A | * | 6/1996 | Togashi et al. | ............. | 428/352 |
| 5,545,831 A | * | 8/1996 | Kaiya et al. | ................ | 524/731 |
| 5,672,428 A | * | 9/1997 | Muschelweicz et al. | .... | 428/352 |
| 5,777,017 A | * | 7/1998 | Funk et al. | ................. | 524/375 |

FOREIGN PATENT DOCUMENTS

| | | | |
|---|---|---|---|
| CA | 1120176 A | * | 3/1982 |
| CA | 1246270 A | * | 12/1988 |
| EP | 0 484 001 A2 | * | 5/1982 |

* cited by examiner

Primary Examiner—Vivian Chen
(74) Attorney, Agent, or Firm—Rosenman & Colin LLP

(57) ABSTRACT

A silicone coating composition comprising an alkylvinylpolysiloxane, an alkylhydrogenpolysiloxane, a platinum complex catalyst and a water-soluble polyester resin is advantageously used for the preparation of a polyester release film having good release property and improved rub-off resistance.

8 Claims, No Drawings

AQUEOUS SILICONE COATING COMPOSITION AND POLYESTER RELEASE FILMS COATED THEREWITH

FIELD OF THE INVENTION

The present invention relates to an aqueous silicone coating composition having an excellent pot life; and to a polyester release film coated by said composition on at least one surface thereof, which is used as a temporary support substrate for an adhesive coated article.

BACKGROUND OF THE INVENTION

Polyesters such as polyethylene terephthalate (PET) are known to possess good chemical stability, physical and mechanical strength, heat resistance, durability, chemical resistance, weather resistance and electrical insulation property; and, therefore, have been widely used in manufacturing various articles including medical devices, capacitors, photographic films, packing and labeling materials, and magnetic recording media.

In addition, a silicone-coated polyester film may be used as a release substrate for adhesive coated articles such as adhesive tapes and peel-off label stickers. A silicone-coated polyester film having high strength, transparency and chemical resistance is particularly desirable in such applications.

Silicone-coated release films are produced by coating a substrate film with a solvent-based or solventless silicone composition. The use of a solvent-based silicone composition, however, induces the problem of releasing harmful organic solvents to the environment, while the coating obtained using a solventless silicone composition which usually has a high viscosity is undesirably thick, which leads to economic disadvantages.

Accordingly, there have been a number of studies to develop aqueous silicone coating compositions.

Canadian Patent No. 1,120,176 discloses an aqueous silicone emulsion consisting of: 1) a diorganopolysiloxane having silicon bonded vinyl groups in their terminal units, 2) an organopolysiloxane having at least three silicon-bonded hydrogen atoms per molecule, and 3) a catalytic amount of a platinum catalyst which promotes the addition of the silicon-hydrogen bonds to the vinyl groups. Similar aqueous-based silicone compositions containing polyvinyl alcohol and alkylphenyl polyglycol ether as emulsifying agents are disclosed in Canadian Patent No. 1,246,270, European Patent Publication No. 484,001, U.S. Pat. Nos. 5,095,067; 5,104,927; 4,791,029; 3,900,617; and 5,777,017.

However, release films coated with the aqueous silicone emulsions mentioned above have poor chemical resistance and unsatisfactory storage stability.

U.S. Pat. No. 5,672,428 teaches an aqueous silicone coating composition comprising: 1) an alkylvinylpolysiloxane containing vinyl groups, 2) a platinum or tin complex catalyst, 3) a glycidoxysilane, and 4) an alkylhydrogenpolysiloxane. Release films coated with this silicone composition exhibit improved chemical and rub-off resistances, but the productivity of this method is not good because the pot life of the composition is severely reduced.

SUMMARY OF THE INVENTION

Accordingly, it is an object of the present invention to provide a silicone coating composition having a good pot life, which is capable of forming a coating having good release property, improved rub-off and chemical resistances.

It is another object of the present invention to provide a polyester release film of which at least one surface is coated with the composition.

In accordance with one aspect of the present invention, there is provided an aqueous silicone coating composition comprising an alkylvinylpolysiloxane; 1.5 to 10 percent by weight, based on the amount of the alkylvinylpolysiloxane, of an alkylhydrogenpolysiloxane; 10 to 500 ppm, based on the amount of the alkylvinylpolysiloxane, of a platinum complex catalyst; and 0.5 to 20 percent by weight, based oil the amount of the alkylvinylpolysiloxane, of a water-soluble polyester resin.

DETAILED DESCRIPTION OF THE INVENTION

In accordance with the present invention, there is provided an aqueous silicone coating composition comprising an alkylvinylpolysiloxane, an alkylhydrogenpolysiloxane, a platinum complex catalyst and a water-soluble polyester resin.

The alkylvinylpolysiloxane which may be used in the present invention is a straight- or branched-chain type, wherein preferred is the straight-chain type. The straight-chain type alkylvinylpolysiloxane has two or more of $R^2$ groups per molecule on the average and a mean viscosity of 10 to 30,000 $mm^2$/sec, preferably 200 to 7,000 $mm^2$/sec at 25° C. Divinylpolydimethylsiloxane having two vinyl groups in its terminal units is most preferably employed in the present invention.

The alkylhydrogenpolysiloxane employed in the present invention is a straight-chain, branched-chain or ring type, wherein preferred is the straight-chain type. The straight-chain type alkylhydrogenpolysiloxane has two or more silicon-bonded hydrogen atoms per molecule on the average and a mean viscosity of 10 to 1,000 $mm^2$/sec, preferably 10 to 100 $mm^2$/sec at 25° C. Polymethylhydrogensiloxane having a hydrogen content of at least 1 weight % is most preferably employed in the present invention. The alkylhydrogenpolysiloxane may be employed in an amount ranging from 1.5 to 10 parts, preferably 2 to 5 parts by weight based on 100 parts by weight of the alkylvinylpolysiloxane.

The alkylvinylpolysiloxane and alkylhydrogenpolysiloxane are cross-linked and cured by inducing a hydrosilation reaction therebetween, the hydrosilation reaction being accelerated by a platinum catalyst such as platinum-1,3-divinyl-1,1,3,3-tetramethyldisiloxane complex. The platinum complex catalyst may be employed in an amount ranging from 10 to 500 ppm based on the weight of the alkylvinylpolysiloxane.

Aqueous silicone emulsions comprising such alkylvinylpolysiloxanes, alkylhydrogenpolysiloxanes and platinum catalysts are commercially available, for example from Dow Corning(Midland, Mich.), GE Silicone (Waterford, N.Y.) and Rhone Poulenc, Inc.(Rockwell, S.C.) under the trade names of Syl-Off 7900/7922, SM 3000/3010 and 71822/71823, respectively. These emulsions are composed of two separate emulsions, i.e., a first emulsion containing an alkylvinylpolysiloxane and an alkylhydrogenpolysiloxane, and a second emulsion, an alkylvinylpolysiloxane and a platinum catalyst.

The water-soluble polyester resin employed in the present invention is water soluble or water dispersible, and contains a controlled amount of ester bonds formed between a dicarboxylic acid having hydrophilic groups and a diol in its main chain.

The amount of the dicarboxylic acid units having hydrophilic groups is preferably below 15 mol %, more preferably 5 to 15 mol %, based on the total dicarboxylic acid units present in the water-soluble polyester resin, wherein examples of hydrophilic groups are alkali metal sulfonate and alkali metal carboxylate groups. Other dicarboxylic acid units are derived from such conventional dicarboxylic acids as dimethylterephthalic acid, terephthalic acid, dimethylisophthalic acid, isophthalic acid, naphthalenedicarboxylic acid, cyclohexanedicarboxylic acid, diphenoxyethanedicarboxylic acid, biphenyldicarboxylic acid, diphenyl ether dicarboxylic acid, anthracenedicarboxylic acid and α, β-bis(2-chlorophenoxy)ethane-4,4'-dicarboxylic acid, among which a combination of dimethylterephthalic acid or terephthalic acid and isophthalic acid(50~80:20~50(mol %)) is preferred.

Examplary diols which are used in preparing the water-soluble polyester resin include: ethylene glycol, 1,4-butanediol, propylene glycol, neopentyl glycol, 1,6-hexanediol, diethylene glycol, triethylene glycol, polyethylene glycol and polypropylene glycol, among which a combination of ethylene glycol and 1,4-butanediol is preferred.

The water-soluble polyester resin of the present invention has a number average molecular weight of less than 50,000, preferably below 25,000, and it may be employed in an amount ranging from 0.5 to 20 parts, preferably 1 to 10 parts by weight based on 100 parts by weight of the alkylvinylpolysiloxane. When the amount of the water-soluble resin used is less than 0.5 parts by weight, the strength of coated film becomes unsatisfactory, while at an amount of more than 20 parts by weight, the force required for peeling-off becomes too great.

Such water-soluble polyester resins are commercially available, for example from SK Chemical Inc.(Korea) and Whaseong Inc.(Japan) under the trade names of SK-100 and SK-300, and WR-901, respectively.

The silicone coating compositon of the present invention may further comprise a curing inhibitor(e.g., 1-ethynylcyclohexanol) to prevent premature cure of the silicon resins at room temperature, and an emulsifying agent(e.g., a combination of polyvinyl alcohol or polyethylene and alkyl phenyl polyglycol ether).

The water content of the aqueous coating composition of the present invention may be in the range of 70 to 97%, preferably 85 to 95% by weight based on the total weight of the composition.

In accordance with another aspect of the present invention, there is provided a polyester release film having a coating formed using the inventive silicone composition, on at least one surface thereof.

The polyester substrate film used in the present invention is made of a conventional polyester resin produced by transesterifying and polycondensing a dialkyl ester of an aromatic dicarboxylic acid and an aliphatic glycol.

Representative dialkyl esters of aromatic dicarboxylic acids include: dialkyl esters of terephthalic acid, isophthalic acid, naphthalenedicarboxylic acid, cyclohexanedicarboxylic acid, diphenoxyethanedicarboxylic acid, biphenyldicarboxylic acid, diphenyl ether dicarboxylic acid, anthracenedicarboxylic acid and α, β-bis(2-chlorophenoxy)ethane-4,4'-dicarboxylic acid, among which dimethyl terephthalate and terephthalic acid are preferred.

Examplary aliphatic glycols include: ethylene glycol, trimethylene glycol, tetramethylene glycol, pentamethylene glycol, hexamethylene glycol and hexylene glycol, wherein preferred is ethylene glycol.

A polyester which may be preferably used in the present invention is composed of 60 mol % or more of ethylene terephthalate repeat units, the remainder being copolymeric repeat units derived from dicarboxylic acids or multifunctional dicarboxylic acids and other diols. Such dicarboxylic acids and multi-functional dicarboxylic acids include: adipic acid, sodium 5-sulfoisophthalate, trimellitic acid and pyrromellitic acid; and said other diols include: diethylene glycol, propylene glycol, neopentyl glycol, polyethylene glycol, p-xylene glycol, 1,4-cyclohexane dimethanol and sodium 5-sulforesolcine.

A polyester film may be prepared by employing a conventional method, for example, by melt-extruding a polyester resin into a cast sheet through a T-die, quenching the sheet on a cold roll, drawing the resulting sheet biaxially and then heat-setting the biaxially oriented film at a temperature ranging from 190 to 240° C.

In accordance with the present invention, the inventive aqueous silicone coating composition is applied to at least one surface of a polyester substrate film and dried to give a polyester release film.

The inventive polyester release film may be obtained by "in-line coating" or "off-line coating" a surface of a substrate film with the inventive composition using any appropriate method selected from roller coating, spray coating, gravure coating, reverse gravure coating, myer bar coating and die coating. Off-line coating is carried out after the heat-setting of a substrate film, and in-line coating, typically between the longitudinal stretching and heat-setting stages of the polyester film manufacturing process. The in-line coating method is preferred because a fully dried coating is obtained.

The thickness of the coating of the inventive polyester release film is 50 to 300 nm.

The following Examples are given for the purpose of illustration only, and are not intended to limit the scope of the invention.

In the Examples and Comparative Examples, the characteristics of the polyester release films produced were evaluated in accordance with the following methods.

1. Release Property

An adhesive test tape of 25 mm width (31B tape from Nitto Electric Industrial Co., Ltd) was applied on the silicone coated surface of a sample film with a force of 19.6 Newton, and pressed against it under a pressure of 20 g/cm² at 70° C. for 20 hours, followed by keeping it at room temperature for 15 minutes. Then, the force required for peeling the test tape off at an angle of 180° C. with a speed of 300 mm/min. was measured in grams/inch.

2. Residual Adhesive Property

The adhesive test tape released after the above test was recovered and applied on a standard stainless steel sheet with a force of 19.6 Newton. Then, the force (F) required for peeling the tape off at an angle of 180° C. with a speed of 300 mm/min. was measured in grams/inch and compared with the force ($F_0$) required for peeling a new adhesive tape off in a similar test. The residual adhesive property of the test tape is expressed by F in percentages based on $F_0$.

3. Rub-off Resistance

The silicone coated surface of a sample film was rubbed by a reciprocating tester with a constant load and speed, and after each stroke an oil-based ink was applied thereon. The number of strokes required for the ink spot to spread and become larger in area by 10% or more was determined. Also, this test was repeated for a film stored under a humidity of 50% at room temperature for 30 days.

4. Emulsion Stability

A silicone coating composition in an aqueous emulsion was stirred gently at 30° C. The composition was observed with a microscope at one-hour intervals and the time for the silicon ingredients to aggregate into particles of 1 mm diameter or more was determined.

EXAMPLE 1

95.7 parts by weight of divinylpolydimethylsiloxane having a viscosity of 1,000 mm$^2$/sec., 0.5 parts by weight of 1-ethynylcyclohexanol, and 3.8 parts by weight of polymethylhydrogensiloxane having a viscosity of 40 mm$^2$/sec. and a hydrogen content of 1.5 weight % were mixed. Added thereto with vigorous stirring was 100 parts by weight of an aqueous solution containing 5 weight % of polyvinylalcohol (Mowiol 4-80 grade from Hoechst Company) and 1 weight % of nonyl phenyl polyglycol ether (Triton N-150 from Union Carbide Company) to obtain a first emulsion.

0.004 parts by weight of Platinum-1,3-divinyl-1,1,3,3-tetramethyldisiloxane complex was suspended in 100 parts by weight of divinylpolydimethylsiloxane, and added thereto with vigorous stirring was 100 parts by weight of an aqueous solution containing 5 weight % of polyvinylalcohol and 1 weight % of nonyl phenyl polyglycol ether to obtain a second emulsion.

0.2 parts by weight of a water-soluble polyester resin (WR-901 from Whaseong Inc.) was dissolved in 80 parts by weight of water, 10 parts by weight of the first emulsion was added thereto, stirred for 10 minutes, and then 10 parts by weight of the secondary emulsion was added thereto, followed by stirring for 10 minutes to obtain a silicon coating composition.

A polyester film substrate of 100 μm thickness (SH71 from SKC Limited) was coated with the above composition using the myer bar coating procedure and dried in an oven at 180° C. for 1 minute to give a polyester release film having a 0.3 μm thick coating.

EXAMPLE 2

The procedure of Example 1 was repeated except that 0.8 parts by weight of the water-soluble polyester resin was used to obtain a polyester release film having a 0.3 μm thick coating.

COMPARATIVE EXAMPLE 1

The procedure of Example 1 was repeated without using the water-soluble polyester resin to obtain a polyester release film having a 0.3 μm thick coating.

COMPARATIVE EXAMPLE 2

The procedure of Example 1 was repeated using 0.5 parts by weight of γ-glycidoxysilane (A-187 from Union Carbide Company) in place of the water-soluble polyester resin to obtain a polyester release film having a 0.3 μm thick coating.

The characteristics of the release films thus obtained were measured and the results are shown in Table 1.

TABLE 1

| | Release property (g/inch) | Residual adhesive property (%) | Rub-off resistance (number of strokes) | | Emulsion stability (hour) |
| --- | --- | --- | --- | --- | --- |
| | | | immediately | after storage* | |
| Ex. 1 | 8.0 | 11 | 10 ↑ | 5 | 5 |
| Ex. 2 | 9.0 | 8 | 10 ↑ | 7 | 6 |
| Comp. Ex. 1 | 8.4 | 10 | 5 | 1 | 3 |
| Comp. Ex. 2 | 7.9 | 14 | 10 ↑ | 8 | 1 |

*Stored for 30 days at room temperature under 50% humidity

As shown in Table 1, the release film obtained in Comp. Ex. 1 exhibits poor rub-off resistance, especially after the prescribed storage, while the coating composition prepared in Comp. Ex. 2 shows low emulsion stability, i.e., a short pot life. In contrast, the silicone coating composition in accordance with the present invention has excellent emulsion stability, and a coating derived therefrom exhibits good release and residual adhesive properties as well as improved rub-off resistance. Therefore, the inventive coating composition may be advantageously used in preparing a polyester release film having an improved quality.

While the embodiments of the subject invention have been described and illustrated, it is obvious that various changes and modifications can be is made therein without departing from the spirit of the present invention which should be limited only by the scope of the appended claims.

What is claimed is:

1. An aqueous silicone coating composition comprising an alkylvinylpolysiloxane; 1.5 to 10 percent by weight, based on the amount of the alkylvinylpolysiloxane, of an alkylhydrogenpolysiloxane; 10 to 500 ppm, based on the amount of the alkylvinylpolysiloxane, of a platinum complex catalyst; and 0.5 to 20 percent by weight, based on the amount of the alkylvinylpolysiloxane, of a water-soluble polyester resin.

2. The composition of claim 1, wherein the combined amount of alkylvinylpolysiloxane, alkylhydrogenpolysiloxane, platinum complex catalyst and water-soluble polyester resin is in the range of 3 to 30% by weight based on the total amount of the composition.

3. The composition of claim 1, wherein the alkylvinylpolysiloxane is divinylpolydimethylsiloxane.

4. The composition of claim 1, wherein the alkylhydrogenpolysiloxane is polymethylhydrogensiloxane.

5. The composition of claim 1, wherein the water-soluble polyester resin contains dicarboxylic acid units having hydrophilic groups in an amount ranging from 5 to 15 mol % based on the total dicarboxylic acid units.

6. The composition of claim 1, wherein the water-soluble polyester resin has a number average molecular weight of less than 50,000.

7. A polyester release film prepared by coating at least one surface of a polyester substrate film with the composition according to one of claims 1 to 6.

8. The film of claim 7, wherein the coating has a thickness of 50 to 300 nm.

* * * * *